June 5, 1928.
A. D. CARDWELL
1,672,367
VARIABLE AIR CONDENSER
Filed Nov. 12, 1925   3 Sheets-Sheet 1
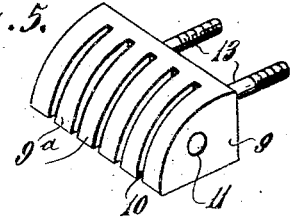
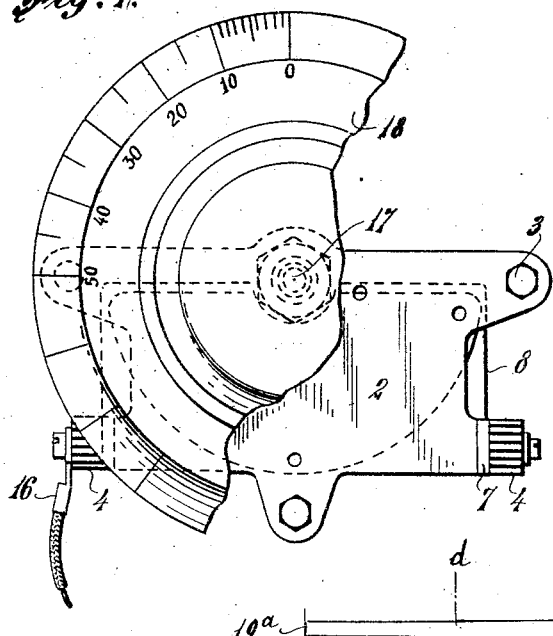
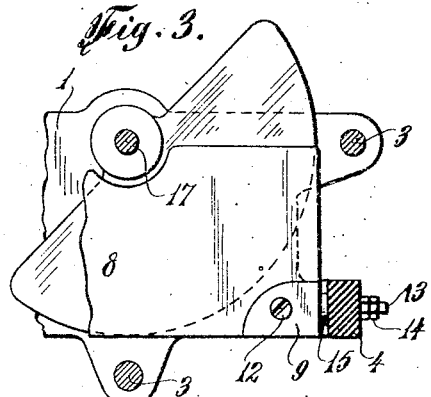
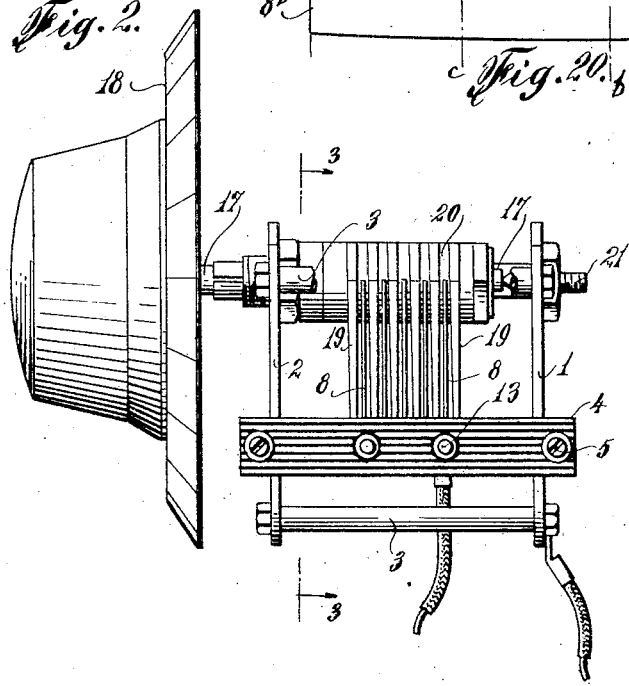
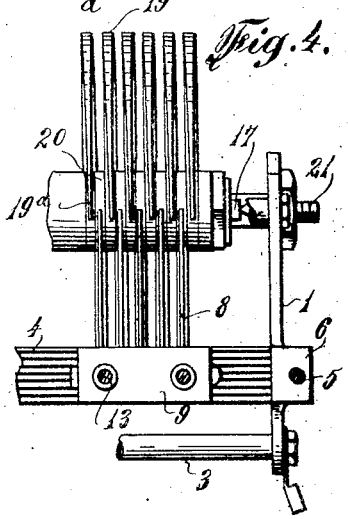
INVENTOR
Allen D. Cardwell
BY
T. F. Bourne
ATTORNEY June 5, 1928.  A. D. CARDWELL  1,672,367
VARIABLE AIR CONDENSER
Filed Nov. 12, 1925   3 Sheets-Sheet 2
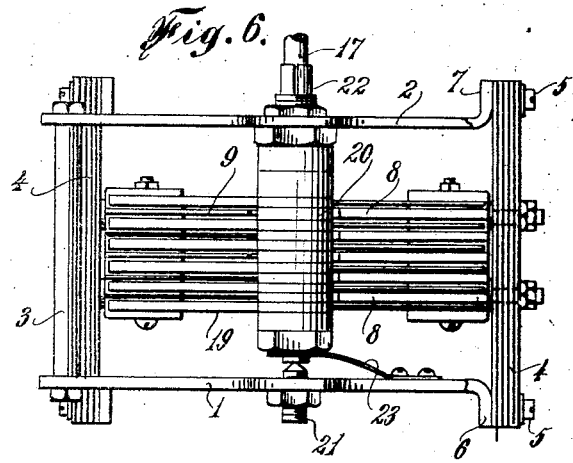
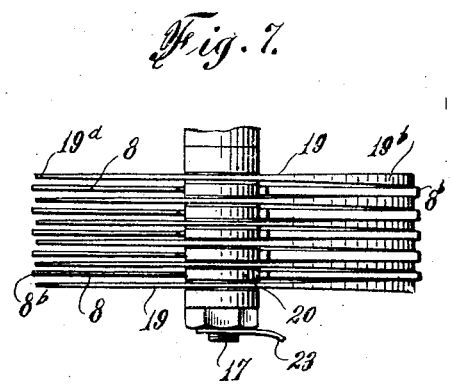
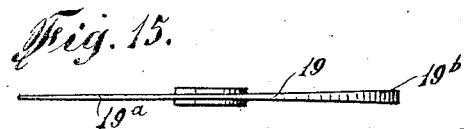
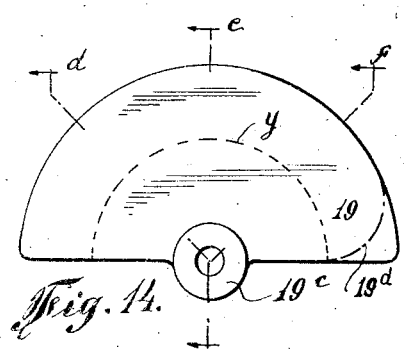
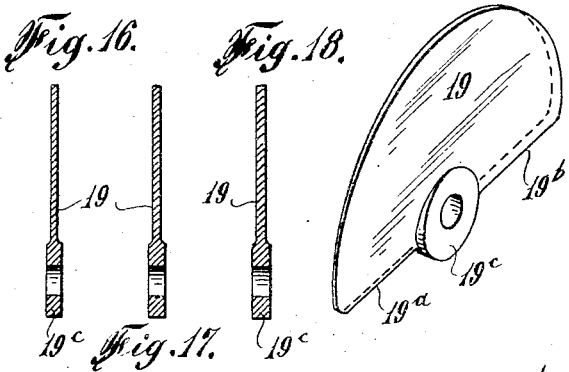
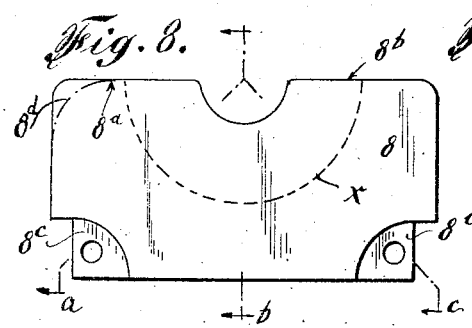
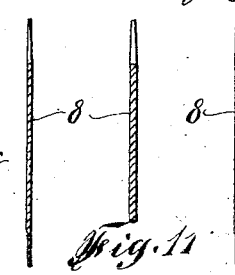
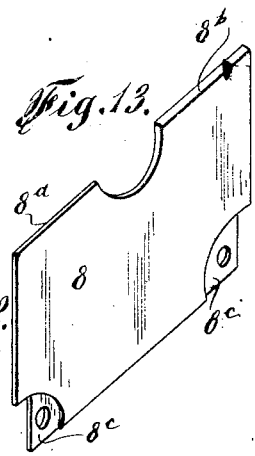
INVENTOR
Allen D. Cardwell
BY T. F. Bourne
ATTORNEY June 5, 1928.
A. D. CARDWELL
1,672,367
VARIABLE AIR CONDENSER
Filed Nov. 12, 1925
3 Sheets-Sheet 3
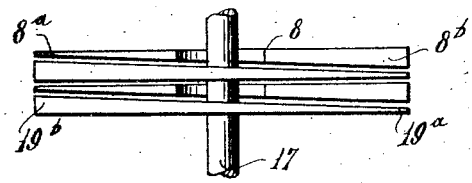
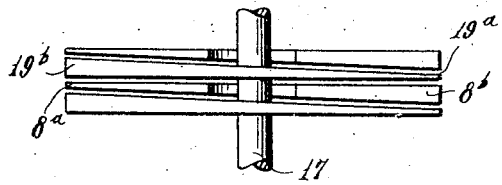
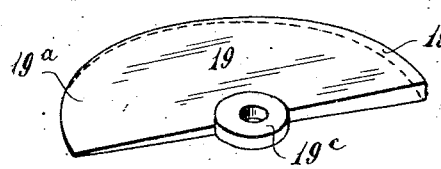
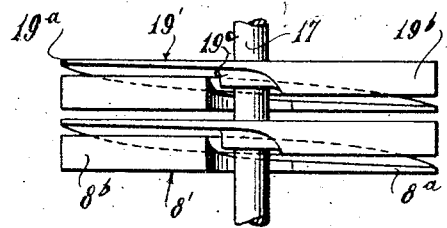
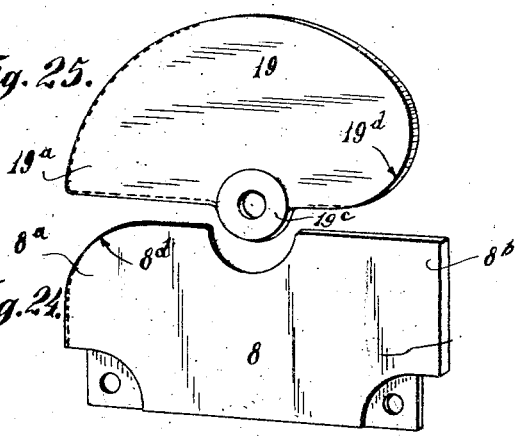
INVENTOR
Allen D. Cardwell
BY
ATTORNEY Patented June 5, 1928.

1,672,367

UNITED STATES PATENT OFFICE.

ALLEN D. CARDWELL, OF ROCKVILLE CENTER, NEW YORK.

VARIABLE AIR CONDENSER.

Application filed November 12, 1925. Serial No. 68,540.

My invention relates to improvements in the class of electrical condensers in which series of plates are movable relatively to another for varying the capacity of the condenser, such as for straight line frequency variation or straight line wave length variation, etc. In the usual forms of such condensers having rotors, as known to me, the thickness of the dielectric between the movable and stationary plates remains constant in their different positions of adjustment and the increase in capacity is linear in accordance with the effective or opposing areas of the plates.

An object of my invention is to vary the thickness of the dielectrics between opposing plates in different operative positions of the plates for varying the capacity of the condenser in addition to the usual variation of the capacity due to variation of the interleaving of the plates.

In carrying out my invention I provide plates of the condenser of such a form that when the plates of the movable element or rotor approach the plates of the stationary element or stator, as at minimum positions, the air dielectrics between the plates may be relatively large, and as the plates interleave to a greater extent the thickness of the air dielectric between the plates of the several elements will decrease, so that as the plates approach or reach the maximum interleaving positions the thickness of the air dielectrics between the plates will be minimum, and conversely as the plates are moved from maximum to minimum capacity positions. In other words, in accordance with my invention when the effective area between the plates of the different elements is increased linearly and the capacity correspondingly increased by reason of the interleaving of the plates the capacity of the condenser will be further increased in greater proportion as the surfaces of the plates approach each other. The decrease of the thickness of the air dielectric between the plates is not necessarily linear in proportion to the rotation or movements of the movable plates but may follow any desired curve in order to produce the particular result desired.

In the examples of my invention illustrated in the accompanying drawings the thickness of the plates of the rotor or movable element and of the stator or stationary element, or of either one of such elements, varies at different portions of the areas of the plates, as by making the plates tapering from one end to another, so that when the rotor plates first enter between the stator plates the air dielectrics between the opposing plates may be large, and as the rotor plates continue to interleave with the stator plates the air dielectrics between the opposing plates gradually decrease until at the point of complete interleaving of the plates the air dielectrics between opposing plates are minimum. This effect is accomplished by so locating the rotor plates respecting the stator plates that when the rotor plates are in minimum capacity position the thinner portions of the rotor plates will be located in position to enter between the thinner portions of the stator plates, so that as the rotor plates are moved for greater interleaving with the stator plates the thinner portions of the rotor plates approach the thicker portions of the stator plates, and the thicker portions of the rotor plates approach the thinner portions of the stator plates, for gradually reducing the thickness of the air dielectrics between the opposing plates, and conversely for increasing the air dielectrics between opposing plates as the rotor is moved reversely.

My invention also comprises details of improvement that will be more fully hereinafter set forth and then pointed out in the claim.

Reference is to be had to the accompanying drawings forming a part hereof, wherein Fig. 1 is a front view of a variable air condenser, the dial being partly broken away, illustrating the plates in maximum capacity position;

Fig. 2 is an edge view of Fig. 1;

Fig. 3 is a detail view, partly in section on lines 3, 3 in Fig. 2, illustrating the rotor plates in partially interleaving position;

Fig. 4 is a detail edge view corresponding to Fig. 2, illustrating the rotor plates near a minimum capacity position;

Fig. 5 is a detail perspective view of supporting means for the stator plates;

Fig. 6 is a partly broken side view;

Fig. 7 is a detail side view showing the plates in the position of Fig. 4;

Fig. 8 is a face view of one of the stator plates;

Fig. 9 is an edge view of Fig. 8;

Figs. 10, 11 and 12 are sections respectively on lines $a$, $b$ and $c$ in Fig. 8;

Fig. 13 is a perspective view of a stator plate;

Fig. 14 is a face view of a rotor plate;

Fig. 15 is an edge view of Fig. 14;

Figs. 16, 17 and 18 are respectively sections on lines $d$, $e$ and $f$ of Fig. 14;

Fig. 19 is a perspective view of the rotor plate;

Fig. 20 is a developed diagrammatic edge view illustrating the variation in thickness of a pair of rotor and stator plates;

Fig. 21 is a detail edge view illustrating a modified form of stator and rotor plates;

Fig. 21$^a$ is a perspective view of a rotor plate of Fig. 21.

Fig. 22 is a similar view illustrating another modification of said plates;

Fig. 23 is an edge view of a further modification of stator and rotor plates; and Figs. 24 and 25 are perspective views respectively of stator and rotor plates in a form modified from that shown in full lines in Figs. 8 and 14.

Similar numerals of reference indicate corresponding parts in the several views.

The main frame of the condenser illustrated comprises end plates 1, 2, which may be of metal, connected together in spaced relation by posts 3, which may be of ordinary or usual construction. At 4 are insulating strips or supports extending transversely respecting the end plates 1, 2, which strips or supports are shown secured by screws 5 to out-turned ears 6, 7 on the end plates 1, 2. The stator comprises spaced metal plates 8 which are supported by the insulating strips 4. I have illustrated supports 9 for the stator plates each comprising a suitable mounting block or piece of metal having spaced slots 10 to receive the corresponding edge portions of the plates 8, the blocks 9 being provided with longitudinal holes 11 receiving screws 12 for retaining the plates between the spaced members 9$^a$ of the blocks. The blocks 9 are shown provided with threaded projections 13 that pass through holes in the strips 4 and are provided with nuts 14 for securing the blocks to said strips. By preference spacers or washers 15 are interposed between each strip 4 and the adjacent block 9 for spacing the latter from the strip with an air gap therebetween, as indicated in Fig. 3, to reduce dielectric losses. A circuit terminal 16 is attached to one of the projections 13 for including the stator element in the circuit.

The shaft 17 of the rotor element is pivotally carried by the end plates 1, 2, which shaft may be provided with any suitable dial or knob 18 for rotating the shaft. The shaft 17 carries spaced rotor plates 19 that are adapted to rotate in parallel planes to interleave with the stator plates. The rotor plates may be secured to shaft 17 in any suitable or well known way with washers 20 interposed between the rotor plates and spacing them apart. The rotor shaft 17 is shown journaled at one end in a step screw 21 carried by end plate 1 and in a sleeve 22 carried by end plate 2, a spring 23 being secured upon end plate 1 and in operative engagement with the rotor shaft, (Fig. 6). As so far described the condenser parts are of a well known type, and may be varied in construction in any desired way.

In accordance with my invention the plates of the stator, or of the rotor, or of both, are so shaped as to vary the thickness of the dielectric between the plates in various positions of the stator and rotor elements relatively to one another. This may be accomplished by making the dimension between the surfaces of the plates different in various localities along the plates. In one form of my invention, illustrated in Figs. 1 to 20, the thickness of the plates varies at different portions of their areas, such as by being graduated in thickness from one portion to another, in tapering shape, and, in some examples illustrated, in such a way that the opposite surfaces of a plate will be parallel along different radii. I have illustrated the edge portions 8$^a$ of the stator plates as relatively thin and the edge portions 8$^b$ as relatively thick, (Figs. 9 and 13), and the edge portions 19$^a$ of the rotor plates as relatively thin and the edge portions 19$^b$ as relatively thick, (Figs. 15 and 19), the plates being so shaped as to taper in decreasing thickness from the edges 8$^b$ and 19$^b$ toward the edges 8$^a$ and 19$^a$ in such a way that, by preference, the surfaces of the plates are parallel in radial directions, as illustrated at $a$, $b$, $c$, in Fig. 8, corresponding to Figs. 10, 11 and 12 regarding the stator plates, and at $d$, $e$, $f$, in Fig. 14, corresponding to Figs. 16, 17 and 18 regarding the rotor plates. In the example referred to the tapering shape of plates 8 is in a curvilinear or arcuate direction from edge 8$^a$ to edge 8$^b$, as along the dotted line $x$ in Fig. 8, and the tapering shape of plates 19 is in a curvilinear or arcuate direction from edge 19$^a$ to edge 19$^b$, as along the dotted line $y$ in Fig. 14. In producing the plates the corner portions 8$^c$ of the stator plates are sufficiently reduced in thickness, and preferably made with substantially parallel surfaces, as to fit properly or snugly within the slots 10 of the blocks or supports 9, with the intervening portions of the supports serving as spacers for the plates, opposing their corner portions, so that the stator plates may all be maintained in parallel spaced relationship although their operating surfaces are tapering or wedge-like. The centrally disposed hub portions 19$^a$ of the rotor plates are sufficiently thick and provided with substantially parallel surfaces to fit properly on shaft 17 between the opposing washers 20, so that the rotor plates may all be clamped in a parallel relationship although their operating surfaces are tapering or wedge-like as before stated. Fig. 20 illustrates an edgewise development of plates 8 and 19, showing variation of thickness at various portions of the plates, the numerals and letters representing the corresponding portions of Figs. 8 and 14.

Instead of making the rotor and stator plates in tapering or wedge-like form in curvilinear planes, such as along the respective lines $x$ and $y$ in Figs. 8 and 14, said plates may vary in thickness in a direction from one extreme edge to another, as illustrated in Figs. 21 and 22. In Fig. 21 the plates taper or are in wedge-like shape from one end to the other, as from the end $8^b$ to the end $8^a$ of the stator plates and from the end $19^b$ to the end $19^a$ of the rotor plates. In the last named figure the plates are in substantially true wedge-like form with both surfaces inclined to a plane at right angles to the axis of the shaft. In Fig. 22 one surface of each plate is inclined with respect to the axis of the shaft and the other surface of the corresponding plate is in a plane at right angles to the axis of the shaft. In Fig. 21 the variation of the thickness of the dielectric between the different plates is not equal for all portions of the opposing surfaces of the respective stator and rotor plates in different angular positions of the rotor, but as the rotor advances from minimum to maximum position the thickness of the dielectric will be decreased and conversely as the rotor is rotated reversely. In the form shown in Fig. 22 the same result of varying the thickness of the dielectric is accomplished as the rotor advances from minimum toward maximum position, and conversely in the reverse direction of rotation of the rotor but with less variation in degree of thickness of dielectric for each degree of angular rotation of the rotor as compared to Figs. 1 and 21.

In Fig. 23 portions of the stator and rotor plates have plain surfaces at $8'$, $19'$ and opposite surfaces of such plates are inclined to a plane at right angles to the axis of shaft 17 and to the surfaces $8'$, $19'$ respectively. It will be understood that the curved portions of the stator and rotor plates of Fig. 23 will be produced in the manner set forth with respect to the curved dotted lines $x$ and $y$ in Figs. 8 and 14.

In the forms illustrated in Figs. 8 and 14 when the elements are at a minimum capacity position the broad surfaces represented by $8^b$ and $19^b$ respectively are in juxtaposition and have a relatively large capacity between them so that as the condenser is revolved to produce a greater interleaving the capacity may actually decrease for a few degrees, and then gradually increase thereafter. To minimize this initial capacity because of the opposing of the broad surfaces of the plates the form illustrated in Figs. 24 and 25 is provided, wherein the thick edge portion $19^d$ of the rotor element is cut away so as to reduce the capacity between such surface and the corresponding surface $8^b$ of stator element 8, and likewise the thin edge portion $8^d$ is cut away or reduced so as to minimize the capacity between $8^d$ and the thin portion $19^a$ of rotor plate 19, the thicker edges $8^b$ and $19^d$ being in juxtaposition and the thinner edges $8^d$ and $19^a$ being in juxtaposition when the plates are in minimum capacity position. This has the additional advantage that the rotor plate is more uniformly balanced because of the distribution of weight around the axis than in the form illustrated in Figs. 14 and 19. It also has the advantage that it is not necessary to have a large variation in dielectric spacing at the low or minimum capacity part of the condenser setting. Some of this gradual increase can be produced by suitably shaping the contour of the plates, as illustrated at $19^d$ and $8^d$.

The relative arrangement of the rotor plates respecting the stator plates is such that when the rotor is in minimum capacity position, (Fig. 4), the thin portions $19^a$ thereof will oppose the thin portions $8^a$ of the stator plates, and correspondingly the thick portions $19^b$ of the rotor plates will oppose the thick portions $8^b$ of the stator plates, (Fig. 7), in edgewise relation. When the rotor is rotating toward increasing capacity position with the rotor plates moving in parallel planes at right angles to the axis of the rotor shaft, the thin portions of the rotor plates will begin to advance between the thin portions of the stator plates, and as the rotation of the rotor is continued in such direction the relatively wide air spaces or gaps between the rotor and stator plates will gradually be reduced, and when the rotor plates are in maximum capacity position between the stator plates, (Fig. 2), the air spaces or gaps between the stator and rotor plates will be at minimum, with the thin portions of the rotor plates between the thicker portions of the stator plates, and the thicker portions of the rotor plates between the thin portions of the stator plates. At intermediate points between the maximum and minimum positions of the rotor and stator plates the air gaps will vary in dimension. Thickness of the dielectrics between pairs of plates will increase as the rotor is rotated toward minimum capacity position.

In accordance with the arrangements and relative relation of the parts set forth, as the effective area between the plates of the different elements increases linearly by reason of the interleaving of the plates the capacity of the condenser increases and such capacity increases further in proportion as the surfaces of the plates approach one another and the air gaps or dielectrics decrease in dimension between the plates. Hence, a greater increase in capacity is secured for equal angular movements of the rotor as the point of maximum capacity is approached as compared to a condenser having air gaps of uniform thickness in all positions of the rotor interleaved with the stator, as in condensers having plates of equal thickness throughout.

Changes may be made in the relative arrangements set forth, within the scope of the appended claim, without departing from the spirit of my invention.

While I have illustrated my invention as embodied in a condenser having a stator and a rotor it will be understood that my invention may be included in a condenser having two sets or series of relatively movable plates for varying the capacity.

Having now described my invention what I claim is:

In a variable air condenser a series of spaced stator plates varying in thickness from one edge toward another and provided with portions having substantially parallel surfaces on opposite sides to symmetrically support the plates in spaced relation, and supporting means for said plates having portions between and opposing said corner portions of the plates for maintaining the plates in spaced relationship with their surfaces of varying thickness maintained in corresponding relation.

ALLEN D. CARDWELL.